United States Patent
Baloukas et al.

(10) Patent No.: US 10,288,787 B2
(45) Date of Patent: May 14, 2019

(54) INTERFERENCE SECURITY IMAGE STRUCTURE

(71) Applicant: CORPORATION DE L'ECOLE POLYTECHNIQUE DE MONTREAL, Montreal (CA)

(72) Inventors: Bill Baloukas, Montreal (CA); Ludvik Martinu, Montreal (CA)

(73) Assignee: POLYVALOR, LIMITED PARTNERSHIP, Montreal, QC (CA)

( * ) Notice: Subject to any disclaimer, the term of this patent is extended or adjusted under 35 U.S.C. 154(b) by 323 days.

(21) Appl. No.: 14/970,770

(22) Filed: Dec. 16, 2015

(65) Prior Publication Data
US 2016/0109629 A1 Apr. 21, 2016

Related U.S. Application Data

(63) Continuation of application No. PCT/CA2014/050567, filed on Jun. 17, 2014.

(60) Provisional application No. 61/836,102, filed on Jun. 17, 2013.

(51) Int. Cl.
| | |
|---|---|
| *G02B 5/28* | (2006.01) |
| *G07D 7/00* | (2016.01) |
| *G07D 7/12* | (2016.01) |
| *B42D 25/378* | (2014.01) |
| *B42D 25/29* | (2014.01) |
| *B42D 25/45* | (2014.01) |
| *B42D 25/351* | (2014.01) |
| *B42D 25/373* | (2014.01) |
| *B42D 25/36* | (2014.01) |
| *B42D 25/425* | (2014.01) |
| *B42D 25/328* | (2014.01) |

(52) U.S. Cl.
CPC ............ *G02B 5/285* (2013.01); *B42D 25/29* (2014.10); *B42D 25/328* (2014.10); *B42D 25/351* (2014.10); *B42D 25/36* (2014.10); *B42D 25/373* (2014.10); *B42D 25/378* (2014.10); *B42D 25/425* (2014.10); *B42D 25/45* (2014.10); *G02B 5/286* (2013.01); *G07D 7/003* (2017.05); *G07D 7/12* (2013.01)

(58) Field of Classification Search
CPC ........ G02B 5/285; G02B 5/286; B42D 25/36; B42D 25/29; B42D 25/351; B42D 25/45; B42D 25/373
USPC .................... 283/72, 82, 83, 89, 94, 98, 901
See application file for complete search history.

(56) References Cited

U.S. PATENT DOCUMENTS

| | | | |
|---|---|---|---|
| 6,650,478 | B1 | 11/2003 | DeBusk et al. |
| 2004/0095645 | A1 | 5/2004 | Pellicori et al. |
| 2008/0031508 | A1 | 2/2008 | Baloukas et al. |

OTHER PUBLICATIONS

PCT/CA2014/050567 international preliminary report.
PCT/CA2014/050567 international search report with related claims.

*Primary Examiner* — Justin V Lewis
(74) *Attorney, Agent, or Firm* — Anglehart et al.

(57) ABSTRACT

The interference filter structure has a filter with a top side and a bottom side, a partially reflecting/transmitting thin metal layer, dielectric spacers on each sides of the partially transparent layer and a semi-absorbing film on at least a portion of top side or bottom side of the dielectric spacers. The filter provides a reflection mode when observed from the top or bottom side and light transmission is side independent.

19 Claims, 9 Drawing Sheets

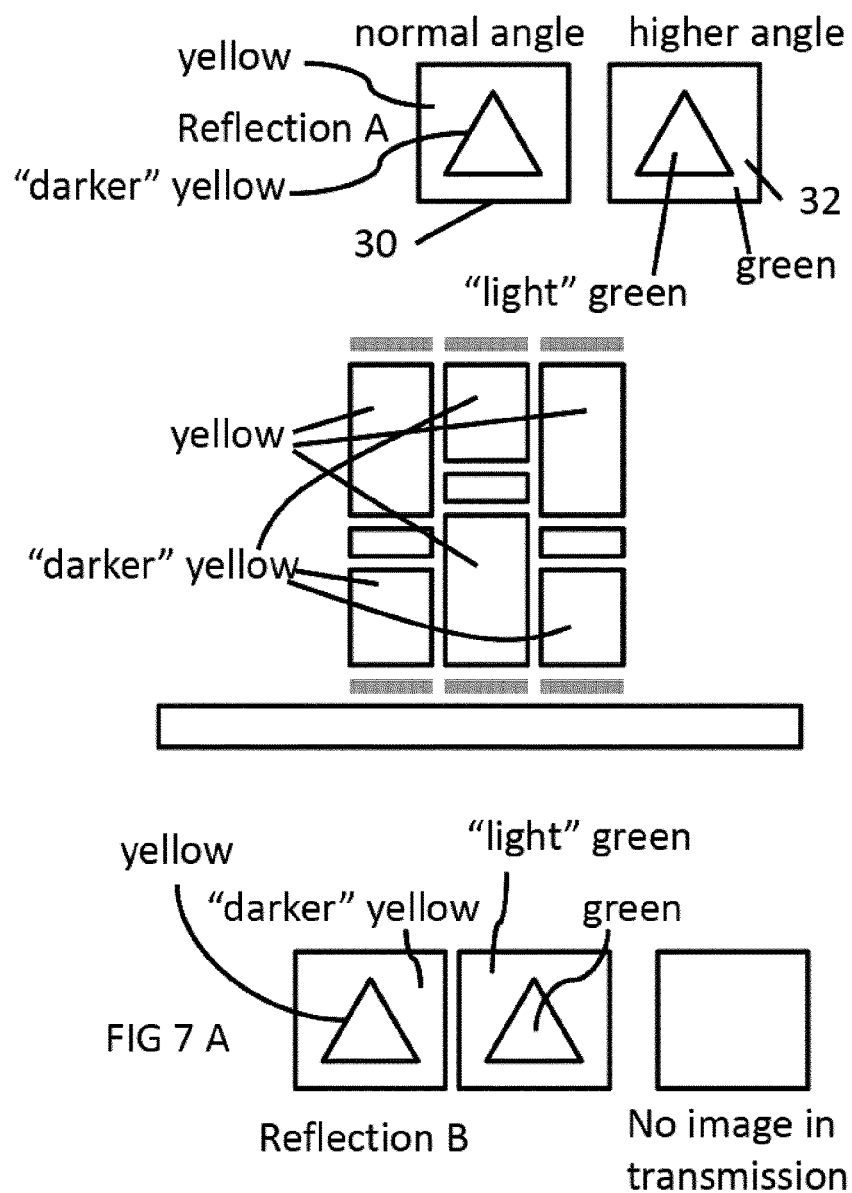

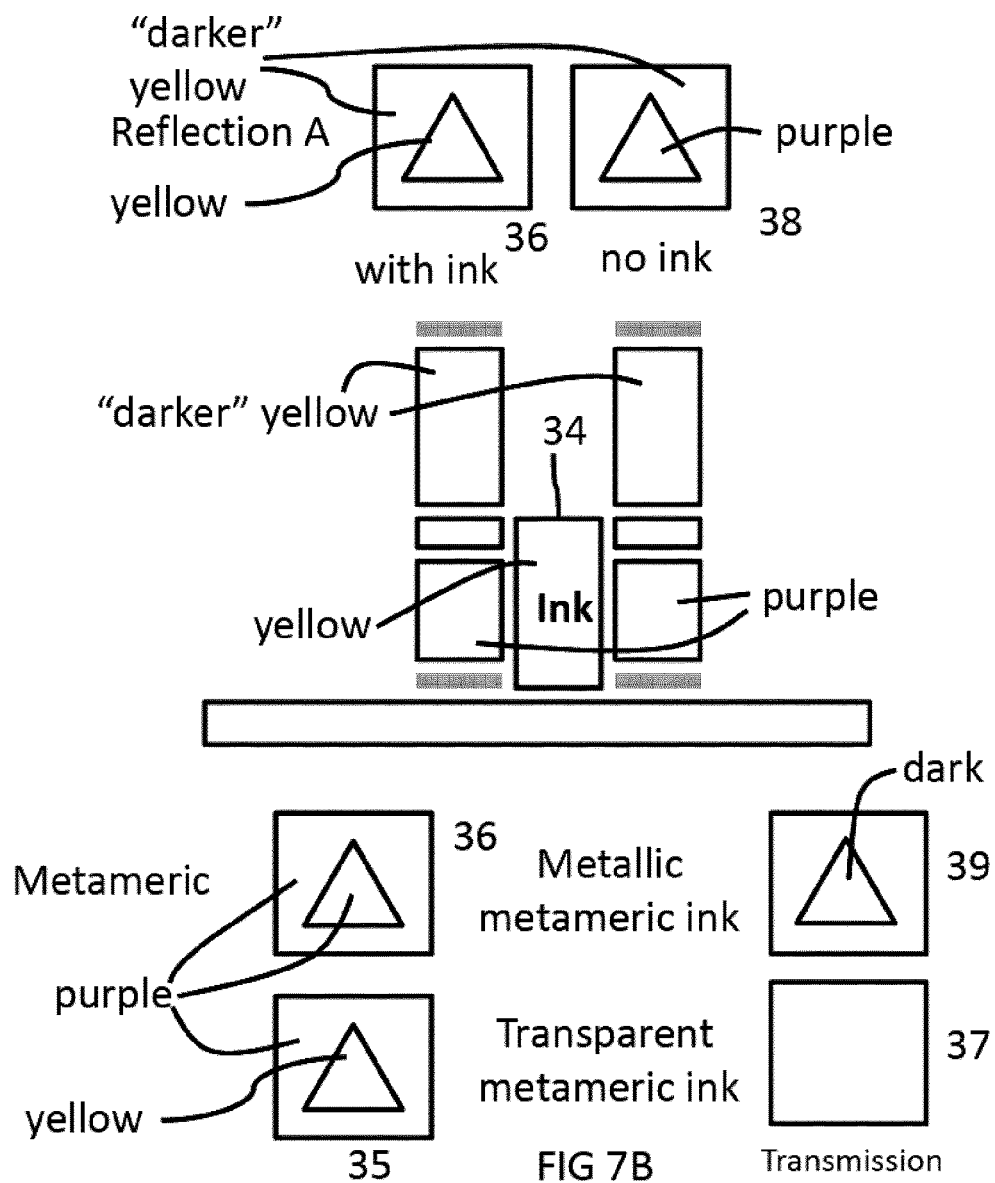

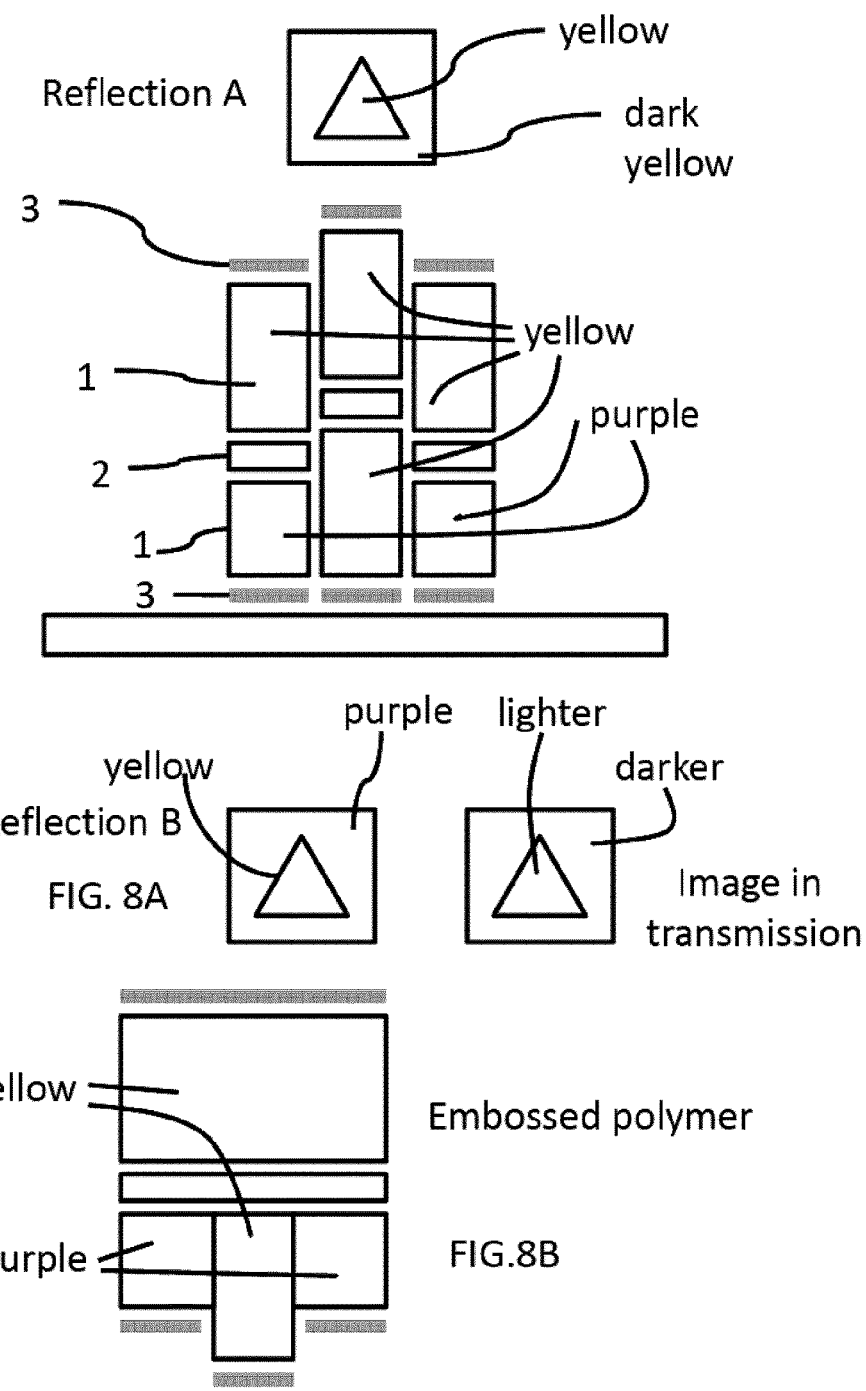

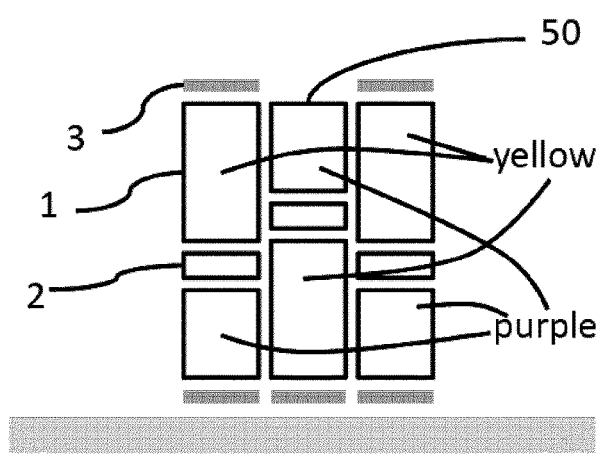
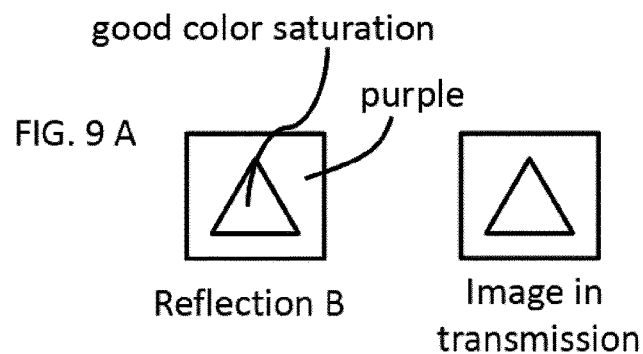
FIG. 9 A

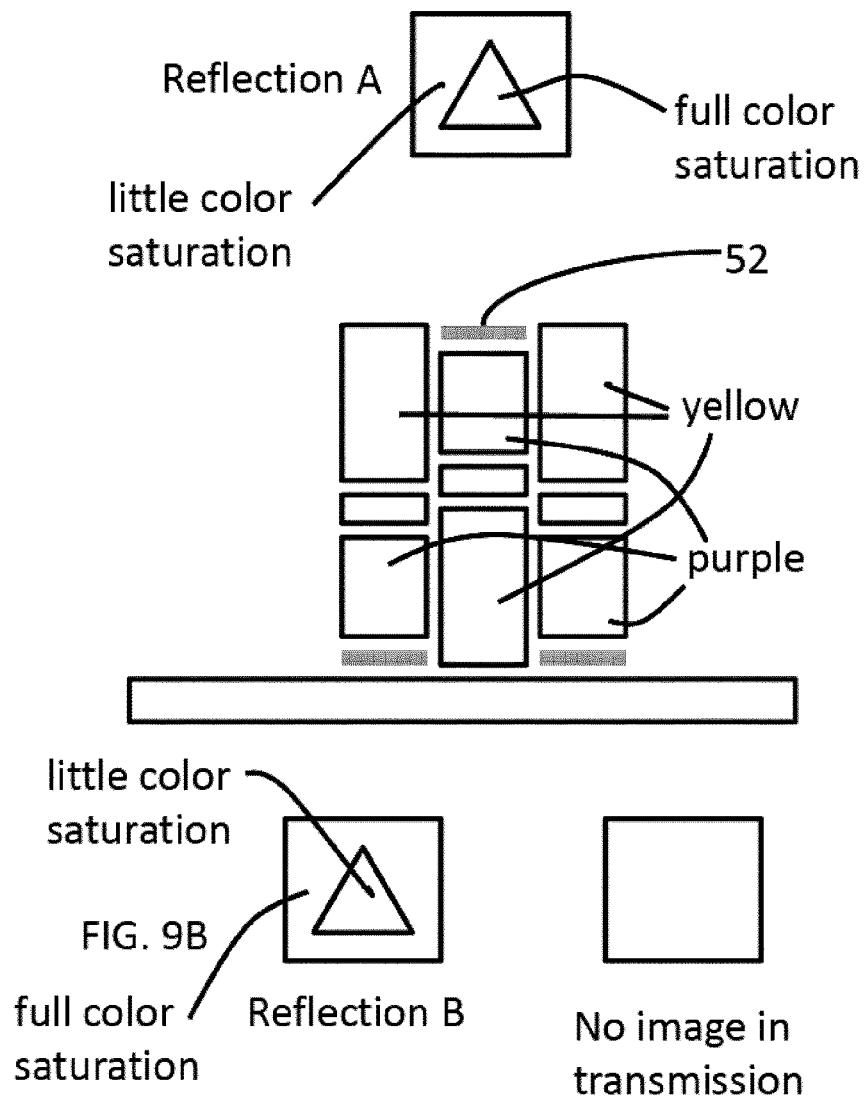

INTERFERENCE SECURITY IMAGE STRUCTURE

This application claims priority of U.S. provisional patent application Ser. No. 61/836,102, filed Jun. 17, 2013.

TECHNICAL FIELD

This invention relates generally to interference security image structures. More specifically, this invention relates to interference filters for security image structures.

BACKGROUND

Counterfeiting costs the world economy hundreds of billions of dollars per year. Aside from monetary losses, counterfeiting also represents a troublesome source of safety issues and health hazards due to the fact that counterfeited products rarely respect manufacturing standards. As a result, governments and institutions have, until now, maintained a suitable lead by wielding technology to their advantage. Consequently, various optical security features such as holograms, interference security image structures (ISIS), watermarks and micro printing have been in circulation for many years. Historically, currency has always been an early adopter of these technologies.

Interestingly, polymer banknotes are gaining in popularity; the most recent example being their adoption by the Bank of Canada and incremental integration into the Canadian market. These banknotes are not only more durable, they also offer the opportunity of creating optical windows, that is, regions of complete transparency. Thus, devices which were typically used in reflection can now be implemented in transmission and used in innovative ways. Incidentally, hybrid paper/polymer banknotes are also in development which will offer similar opportunities. Hence, the presently proposed feature takes advantage of this change in trend.

Interference-based security devices have been in circulation for more than two decades. Their iridescent properties, that is, their change in color as a function of the observation angle, have indeed been highly effective in inhibiting counterfeiting as well as accepted by the general public. Unfortunately, iridescent consumer products such as color shifting co-extruded polymer wrapping foil have now become readily available, and may render basic interference-based devices obsolete.

Classically, devices used in transmission are based on all-dielectric filters which are in first approximation absorption free in the region of interest i.e. the visible spectrum. On the other hand, although one can use such devices in transmission, their color in reflection and transmission is side-independent. The other alternative, which requires a lower amount of layers and thus is also the most popular, is metal-dielectric filters, but their use in a transmission mode is limited by their opaque metallic mirror. In addition, although the side-dependent reflection phenomenon which it is possible to generate using these structures is also known, to our knowledge it has yet to be exploited in optical security.

Metal-dielectric structures currently in use are typically based on the following three-layer system: an opaque metallic reflector, a dielectric spacer and a thin partially absorbing film. Such Fabry-Perot-like structures provide very high color saturation with a minimum of layers due to a combination of interference and of selective absorption. However, these structures are usually poorly adapted for uses where it is desirable to have a transmission mode and are limited to optical effects on a single side.

Also, metal-dielectric structure displaying angular color shift are disclosed in U.S. Pat. No. 8,064,632 to Baloukas et al. however the structures disclosed therein contain a large number of dielectric material layers making them more expensive to produce.

In light of the above there is a need for improved interference security image structures.

SUMMARY

This invention pertains to the use of optical interference filters for anti-counterfeiting applications on documents such as bank notes and their integration into an innovative architecture. While we focus on security applications the interference filter of the invention may also be used for other applications where side-dependent optical properties are required. By using metal-dielectric filters, it has been found that it is possible to fabricate a device which offers a total of three color shifts: two in reflection from either side as well as one in transmission (independent of the observation side). Mainly, by patterning such a filter it is possible to generate images with various shapes. In addition the filter of the invention provides advantageous properties that will be further described below such as invisible images when observing in transmission due to side-independent transmission. The properties of the filter of the invention can make such filters machine-readable and essentially all color combinations obtainable by classic Fabry-Perot-like filters are feasible in reflection mode with the present filter thus resulting in a large number of possible variations. The basic filter configuration of the invention can also be combined with other technologies such as metameric devices and chromogenic (electrochromic, thermochromic, photochromic and the like) materials.

BRIEF DESCRIPTION OF THE DRAWINGS

The invention will be better understood by way of the following detailed description of embodiments of the invention with reference to the appended drawings, in which:

FIG. 7A is a schematic representation of an image-patterned metameric device.

FIG. 7B is a schematic representation of an image-patterned metameric device with non-iridescent material.

FIG. 8A is a schematic representation of a single-patterned dielectric spacer.

FIG. 8B is a schematic representation of a single-patterned dielectric spacer comprising a polymer FIG. 9A is a schematic representation of filter with the semi-absorbing layer patterned.

FIG. 9B is a schematic representation of filter with the semi-absorbing layer patterned.

DETAILED DESCRIPTION

In the present description the term reflection mode means that a light source (artificial or day light or combination thereof) is provided on the same side as the observer of an object and that the light is reflected at least in part on the object. By transmission mode it is meant that a light source (artificial or daylight or combination thereof) is provided from the side opposite the observer such that light is transmitted, at least in part, through the observed object.

Figure 1:
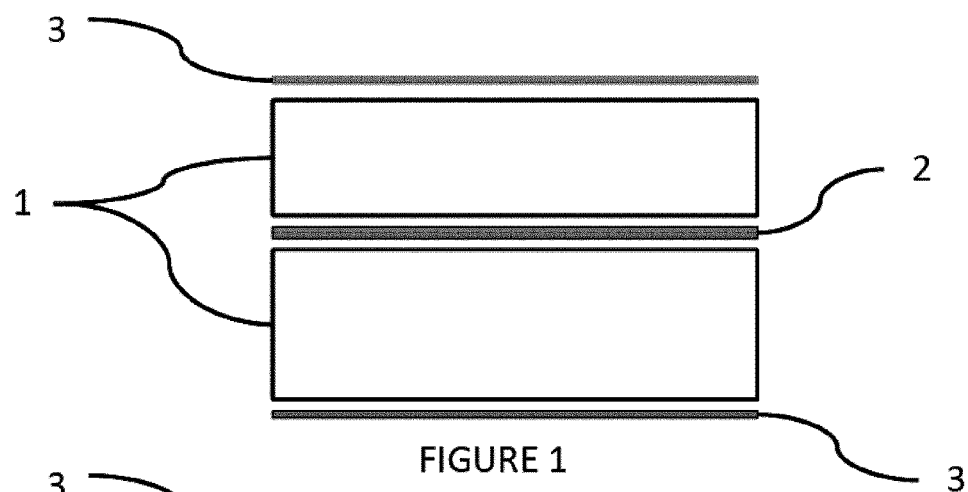
FIG. 1 is cross-section view of an embodiment of the filter of the invention.
Figure 5:
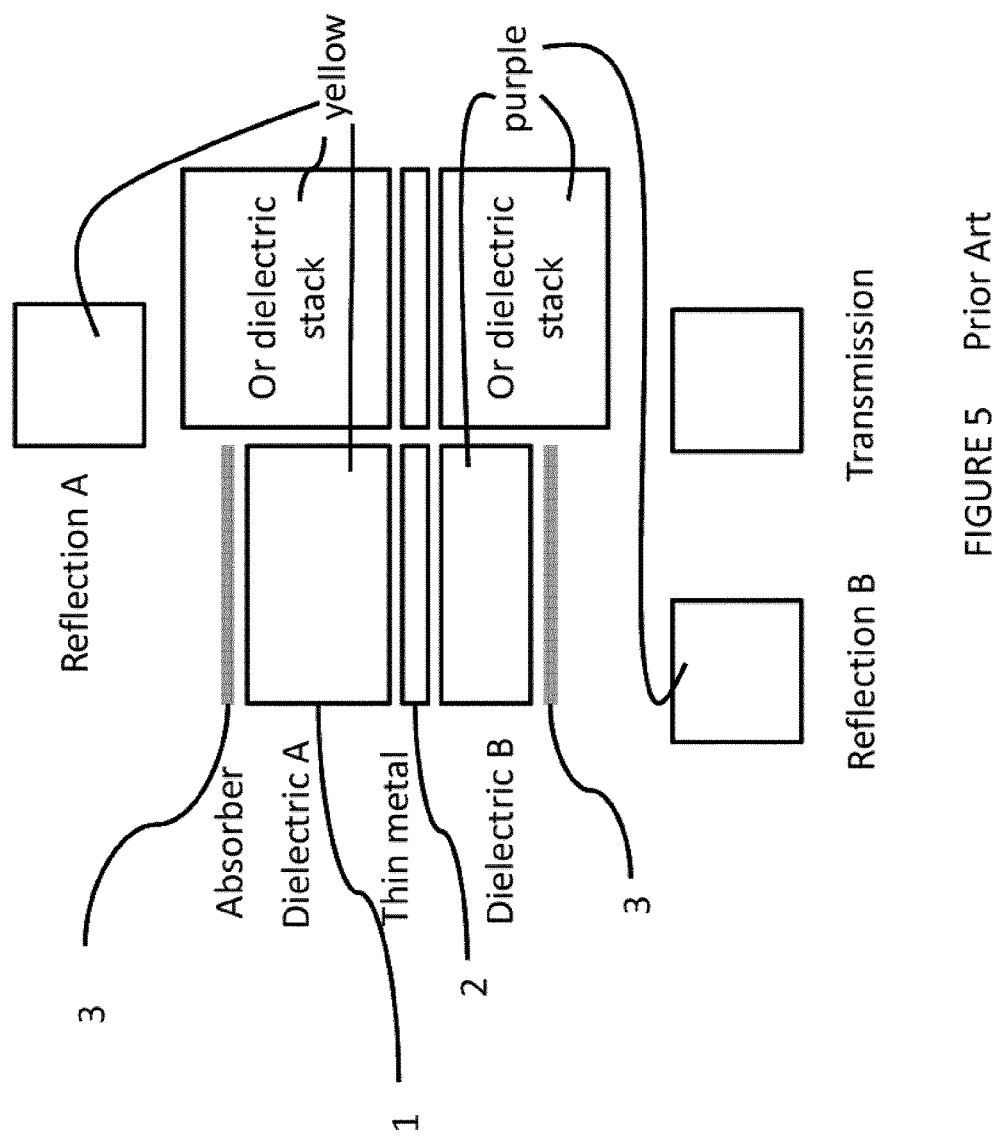
FIG. 5 is a schematic representation of a filter with no image pattern.

The interference security image structure (ISIS) which has been developed comprises an optical filter having the following general structure (FIG. 1): two dielectric spacers 1 adjacent to a partially reflecting/transmitting layer 2 with a film 3 of semi-absorbing material on the dielectric spacers (see also FIG. 5). The combination of interference and selective absorption by the various components is responsible for the spectral characteristics of the filter.

The dielectric spacers are preferably different with respect to at least one of their characteristics (for example thickness or molecular composition) such that their optical thicknesses give rise to a different color. The dielectric spacers can thus provide an asymmetric optical structure with respect to the partially reflecting/transmitting layer. In some embodiments and as will be described in more details below this structure allows the two sides of the filter to display different spectra when observed in a reflection mode and display yet a different spectrum in transmission mode. The filter structure can also provide angular color shift that depends on the angle of observation.

Figure 2:
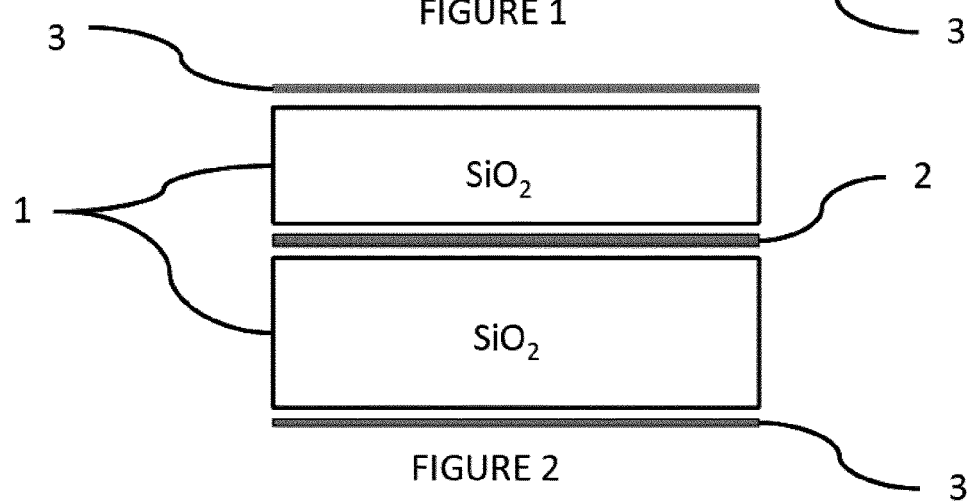
FIG. 2 is a cross-section view of an embodiment of a dielectric spacer.
Figure 3:
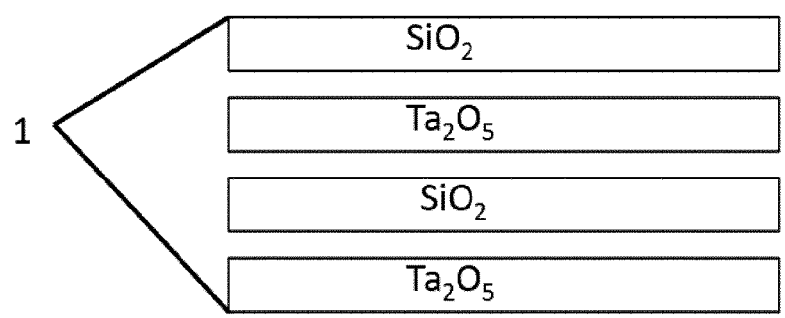
FIG. 3 is a cross-section view of an embodiment of a dielectric spacer.

Referring to FIG. 2, the dielectric spacers 1 may consist of one or a plurality of layers of dielectric material. A spacer may consist of a single type of material or combination of materials. FIG. 2 schematically represents a dielectric spacer made of layers of a single material and FIG. 3 that of a spacer with alternating layers of different material.

The choice of material and properties such as thickness of the filter are selected based on the desired optical effect and desired color shifting properties. For example it can be demonstrated from Snell's law that total angular color variation is a function of the index of refraction. Therefore, choosing a low index of refraction dielectric material increases the total angular color variation (or also the speed of change). Examples of dielectric material that can be used to produce optical effects desirable for applications considered in the present disclosure include $MgF_2 (n_{550nm}=1.38)$, $SiO_2 (n_{550nm}=1.49)$, $Al_2O_3 (n_{550nm}=1.77)$, $ZnCl_2$, $ZnTe$, $Ta_2O_5$, $Nb_2O_5$, $ZrO_2$, $TiO_2$, $WO_3$, $VO_2$, $V_2O_5$, $Cr_2O_3$, $HfO_2$ and the like. Polymers, such as elastomeric materials, may also be used as dielectric spacers alone or in combination with non-polymeric dielectrics. Non-limiting examples include poly-di-methyl-siloxane (PDMS) and ethylene propylene.

Color saturation is an important property of an object that plays a role in the ability of the human eye to perceive spectral variations. Modifying the thickness of the spacer allows one to adjust the position of the reflection peaks. In order to obtain a sufficient color saturation a minimum thickness for a dielectric filter of 2 quarterwaves is usually required whereas more than 8 quarterwaves will usually result in a loss of saturation due to the presence of a high number of interference fringes in the visible spectrum. The optical thickness thus allows one to tune the color of the feature at normal incidence. A preferred range of thicknesses is between approximately 100 and 1000 nm. Interestingly, using high index of refraction spacers which limits the color travel can be of interest for additional color properties.

The semi-absorbing film 3 can play a role in the level of color saturation. Typical materials that can be used are Cr (n/k=0.70), Ni, Inconel, V, Au, Cu, Zn and the like can be selected based on their absorption spectra characteristics. The thickness of the film dictates in part the degree of light absorption and can be adjusted to achieve the desired color saturation and intensity under illumination conditions likely to prevail when a documents bearing the interference security image structure is inspected. The thickness is preferably of the order of approximately 2 to 15 nm. Metals which possess refractive index to extinction coefficient (n/k) ratios closest to one provide the highest color saturations. Also, the semi-absorbing film 3 can affect how the filter reacts to the environment, that is its chemical resistance. For example, thin metal films exposed to ambient conditions may be prone to oxidation. Consequently, the filter of the present invention can be laminated in order to limit degradation of film 3 as well as film 2.

The semi-absorbing film can be a metal film presenting nanoclusters (Brandsealing®). By controlling the size and shape of the clusters, the plasmon resonance excitation can be finely tuned and serve as an optical code which is machine readable. It is also possible to integrate an anisotropically scattering layer over the dielectric spacer which is then coated with a semi-absorbing film. Although such structures exhibit a limited change in color when tilted due to their highly diffuse nature, they still retain good color saturation. Their anisotropic nature also allows for the generation of rotation-dependent optical effects.

The partially reflecting/transmitting layer 2 can be selected from materials that are usually found in metallic mirrors such as Al, Ag, Pt. Other less typical metallic films can also be used such as Cr, Zn, Au, and the like. In the filter of the present invention it has been shown that by providing a thin metal layer within the dielectric stack it is possible to retain very good reflective properties from both sides of the filter while enabling the filter to operate in transmission mode. The thickness is preferably between 2 and 25 nm depending on the extension coefficient of the reflector. It will be appreciated that the choice of material and thickness of the layer 2 can be set so as to optimize the desired optical characteristics of the filter. Discontinuous films presenting plasmon resonance such as gold, silver and copper (nano-islands) also offer the advantage of absorbing light in a relatively narrow spectral range and thus have been shown to increase the luminous transmittance while still maintaining the side-depending reflected colors (structure: dielectric stack|partially reflecting/transmitting discontinuous film|dielectric stack).

Interference filters, having the desired optical properties can be designed, for example, by using the OpenFilters software (S. Larouche and L. Martinu, "OpenFilters: Open-Source Software for the Design, Optimization and Synthesis of Optical Filters", Appl. Opt., 47, C219-C230 2008), TFCalc 5.1 from Spectra Inc., Matlab and any other programming language or thin film design software as would be known to one skilled in the art.

We will now describe in more details how the reflection/transmission property of the filter provides the possibility of designing a variety of filter structures that can generate an impressive number of image patterns some of which will be described below. It will be appreciated that when the text refers to different colors different hatching patterns have been used in the drawings.

Figure 4A:
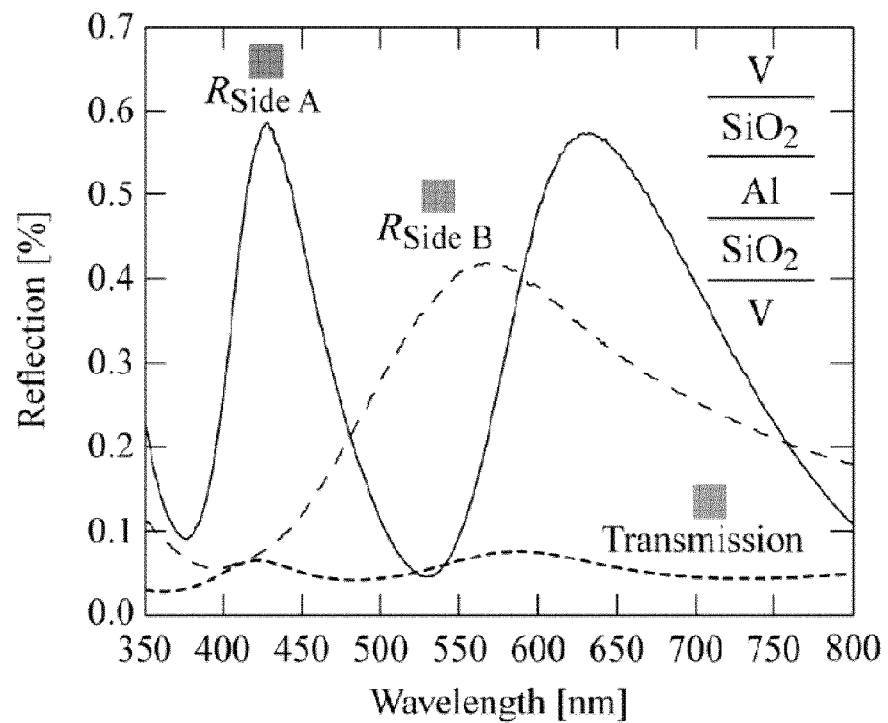
FIG. 4A is a spectrum of an asymmetric five-layer triple color shift metal dielectric filter (MDF) with the following architecture: absorber|dielectric spacer|thin metallic mirror|dielectric spacer|absorber where one can see how the reflection spectra, measured at 25°, on sides A and B differ widely and that a low but sufficient transmission is also present.

FIG. 4A shows an example of a five layer filter (semi-absorbing film/dielectric spacer/partially reflecting-transmitting layer/dielectric spacer/semi-absorbing film) where the partially reflecting-transmitting layer 2 (in this case aluminum) has a thickness of approximately 10 nm. One can see that the reflection spectra on side A and side B (top side and bottom side) are completely different; in fact, by appropriately choosing the thicknesses of the dielectric spacers, all the colors available by a standard three-layer metal dielectric filter (MDF) are possible. Most importantly, the filter in FIG. 4 also possesses a transmitted component which is side-independent. This type of device therefore presents a total of three color shifts (side A and side B reflection and transmission), offers a surprising side-dependent color and could be of interest for use on polymer or hybrid paper-polymer banknotes where transparent windows can be implemented.

Figure 4B:
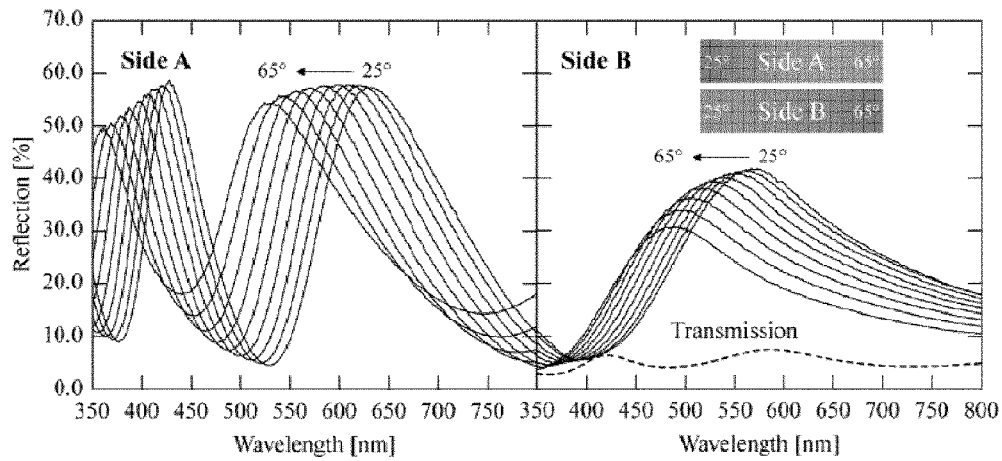
FIG. 4B is a spectrum of an MDF filter with an architecture as in FIG. 4A showing the angular color shift.

The angular shift property of the filter of the invention is exemplified in FIG. 4B where spectra of reflection for a range of viewing angles are shown.

The filter of the present invention may also comprise one or more embedded images. The filter structure offers the opportunity of creating an image using a single filter. In some embodiments the image can be seen from both sides of the filter in different colors. This is made possible by the side-dependant reflected colors of the filter.

To make images in combination with the filter various patterning techniques may be of use: lithography, laser, ink-jet printing (printing in general), hot stamping, flexographic printed oil, and the like as would be known to a person skilled in the art.

Figure 6:
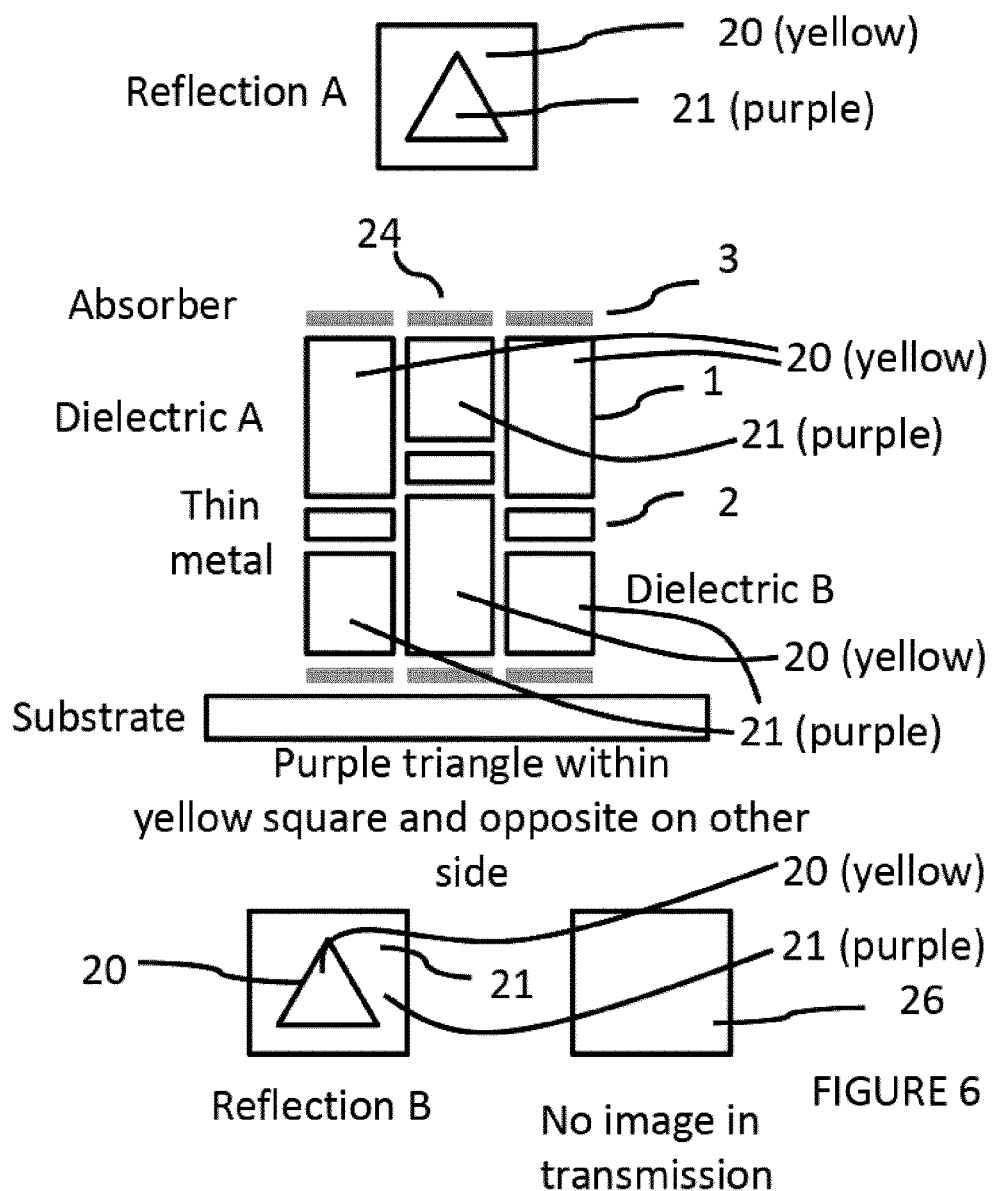
FIG. 6 is a schematic representation of a filter with inverted asymmetry in the image-patterned section.

In an aspect of the invention, part of the filter, having a desired shape, may be "inverted". As a result, in reflection mode, the image generated on side A will exhibit a two color pattern 20 and 21. The section of the filter that is inverted displays the color(s) of side B 21 in a frame of color side A 20. In the example provided in FIG. 6 the "inverted" part 24 has a triangular shape and the filter is square. The image generated on side B will exhibit the opposite combination of colors to give a "negative/positive" effect. When tilting the device, both elements display a color shift (yellow to green and purple to light green). The "negative/positive" effect may be achieved by simply cutting out the desired shape in the filter and "flipping" it. This image patterning could also be achieved by hot stamping and using a release layer to transfer the filter onto another substrate. Using a "roll-to-roll" process one can use flexographic printing to generate a triangle on one half of a polymer web and a square with a triangle cut out on the other half. The web can then be folded upon itself to complete the filter structure to generate the "negative/positive" image. Alternatively, the filter could be constructed with the desired pattern using masking/etching for example during the deposition of various layers. In such an arrangement the image is not visible in transmission mode 26.

In yet another example and as shown in FIG. 7A the filter may incorporate the properties of metameric devices to generate images. In metameric devices the colors of objects with different spectral distributions are matched at predetermined viewing angle(s). The filter is patterned so as to generate an image that is barely visible (color of triangular shape almost matching the color of the square, the resulting image represented at 30) at a predetermined angle of view, for example at normal incidence, and when the angle of view is changed (for example increased) there is a color shift that results in a color contrast between the shape and its surrounding (represented at 32). It will be appreciated that the angle of view at which the image is "seen" can be chosen. For example the filter can be designed to see the fully contrasted image at normal incidence and barely visible at a higher viewing angle. In this configuration there is no visible image in transmission.

A metameric effect can also be generated by including a metameric non-iridescent material, with the desired pattern, in the filter (FIG. 7B). For example ink 34 can be printed in an appropriately patterned filter. By selecting an ink (for example metallic ink) color closely matching the color of a given side in the reflection mode the shape will appear barely visible from that side 36 (shown as yellow and darker yellow in FIG. 7B) but visible if not using metameric ink 38 (darker yellow and purple), while on the other side the reflection is similar whether metallic metameric ink is used or transparent metameric ink is used. When using metallic ink, the shape appears opaque in the transmission mode 39. It is also possible to use a metameric transparent ink. In this case no image will be seen in transmission mode 37 but an image can be seen in reflection mode 35.

In a further example (FIG. 8A), only one of the dielectric spacers is patterned so as to make the image visible on only one side in reflection mode. In the example of FIG. 8A, the image is seen in reflection from side B as the filter is patterned on this side only. The image would also be seen in transmission. The single dielectric pattern may be achieved by combining two filters. One filter, with the desired shape, having dielectric spacers that are symmetric with respect to the partially reflecting/transmitting layer that is embedded in a filter that is asymmetric. Alternatively, the desired single dielectric pattern may be achieved by patterning while assembling the filter. For example, the semi-absorbing film 3 is deposited followed by the first spacer that can be patterned by using photolithography or masking and etching and then depositing the rest of the filter (partially reflecting/transmitting layer, second dielectric spacer, second semi-absorbing film). In the case where a polymer is used or integrated in a non-polymeric dielectric embossing can be can be used to pattern the polymer, as shown in FIG. 8B.

In yet a further example, the semi-absorbing film can also be patterned to achieve different image coloration. Referring to FIG. 9A the semi-absorbing film 3 can be patterned on one side only and the image-shaped section 50 of the filter "flipped" so that in reflection mode the image is seen but with little color saturation for the shape (triangle, reflection A). The image generated on the other side (reflection B) in reflection mode would display full saturation. An image would be visible in transmission because of the difference in the filter structure along the triangular section.

In a variation of this embodiment, the semi-absorbing film 3 is deposited on only one of the dielectric spacer and the triangular shape section 52 is "flipped" (FIG. 9B). In this case, on one side, the triangle will appear with full saturation with the square exhibiting little saturation (reflection A) and on the other side (reflection B) the inverse effect is achieved (triangle with little saturation and square with full saturation). Because the structure of the filter is the same everywhere, albeit inverted in the triangle section, no image is visible in the transmission mode.

Note that in general images that are visible in transmission may not have the same color as in reflection mode.

It will be appreciated that the triangle/square pattern is only an example and that other shape patterns can be generated as desired.

The interference filter of the present invention can be combined with other technologies to provide additional features that can be useful to increase the difficulty of counterfeiting. By combined it is meant that the other technology(ies) may be inserted in the filter or in close association thereof. For example:

Metameric devices. In fact, one can fabricate a device which displays the same color on both sides, but which when tilted displays an image. This can be done by choosing the appropriate dielectric spacer thicknesses or by using two different dielectric materials (e.g., high and low index of refraction). See also U.S. Pat. No. 8,064,632, the description of which is hereby incorporated herein by reference in its entirety.

One can also implement the metameric devices in conjunction with a non-iridescent material in transmission or reflection in order to add an additional optical effect.

Hybrid diffractive/interference devices. It is also possible to combine the present technology with diffractive-based features in order to generate hybrid devices presenting novel optical effects.

Active electrochromic devices. The concept of an active device, which we have covered in our previous patent, can also be implemented in the present feature. Without necessarily creating an image, one could fabricate a triple-color device which also possesses a voltage driven color change in the case of the use of an electrochromic material.

Piezochromism. By replacing one or both of the dielectric spacers by a suitable polymer or hybrid polymer/dielectric material one can create a device which is pressure sensitive (color changes upon application of pressure). In the case of a metameric device where only one spacer is replaced, one could use pressure to reveal a hidden image as well as the observation angle.

Other active elements. The proposed filters could also be used in conjunction with other active materials (thermochromic, piezochromic, photochromic, UV fluorescent, upconverting nanoparticles, magnetic materials etc.).

In another aspect of the invention there is provided a method for the fabrication of the interference filter of the invention.

In one aspect, the method comprises the steps of providing a substrate for the deposition of the layers comprising the filter, forming a semi-absorbing film on the substrate, depositing one or a plurality of dielectric layers on the film to form a first side dielectric spacer, depositing a partially reflecting/transmitting layer on the first side dielectric spacer, depositing one or a plurality of dielectric layers on the partially reflecting/transmitting layer to form a second side dielectric spacer and forming a semi-absorbing film on the second side dielectric spacer.

As used herein, the term substrate refers to the base material onto which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET); or a composite material of two or more materials, such as a laminate of paper and at least one plastic material, or of two or more polymeric materials. The substrate may be transparent, however the filter of the invention is not limited to transparent windows. For example, one can appose such a filter onto paper. The filter's high reflectivity will mask any underlying information but, upon shining a bright light under the device and thus through the paper, one can reveal the hidden information. This in effect reveals the transparency of the device.

Note, that although this effect is also possible using all-dielectric filters, it is less costly to implement with a metal-dielectric architecture.

Alternatively the filter may be constructed on a polymer or glass and transferred onto the final substrate using a release layer such as wax or synthetic wax as a low adhesion release layer.

Deposition of the various layers of the filter can be achieved by roll-to-roll coating using e-beam evaporation, known for its high deposition rate or any other thin film deposition method, e.g. dual ion beam sputtering, magnetron sputtering, etc. Deposition systems should preferably be equipped with an optical monitoring system to control the thickness of the layers in situ and, consequently, the resulting color. A precision as high as 1.5% on thickness is typical and can be required to maintain color consistency. Due to the porous nature of e-beam evaporated films, the design may need to be adjusted to account for the absorption of water once exposed to the ambient environment.

What is claimed is:

1. An interference filter structure comprising a filter having a top side and a bottom side, the filter comprising:
   a partially reflecting/transmitting thin metal layer;
   dielectric spacers on each side of the partially reflecting/transmitting thin metal layer, and a semi-absorbing film on at least a portion of a top side of a top one of the dielectric spacers, and a bottom side of a bottom one of the dielectric spacers;
   wherein the filter provides a reflection mode when observed from a top or a bottom side of said filter, wherein light transmission is side independent, and wherein the filter is an angular color shift filter.

2. The interference filter structure of claim 1, wherein the dielectric spacers are asymmetric with respect to the partially transparent layer to provide different light reflection spectra when observed from the top side and bottom side of the filter.

3. The interference filter structure of claim 1, wherein the dielectric spacers comprise a plurality of dielectric material layers.

4. The interference filter structure of claim 1, wherein the dielectric spacers are made of a material selected from MgF2, SiO2, Al2O3, ZnCl2, ZnTe, Ta2O5, Nb2O5, ZrO2, TiO2, WO3, VO2, V2O5, Cr2O3, HfO and combinations thereof.

5. The interference filter structure of claim 1, wherein the dielectric spacer has a thickness of between about 100 nm to about 1000 nm.

6. The interference filter structure of claim 1, wherein the partially reflecting/transmitting thin metal layer is made of a material selected from Al, Au, Ag, Pt, Cr, V, Ni, W, Inconel, Cu, Zn and combinations thereof.

7. The interference filter structure of claim 1, wherein the partially reflecting/transmitting thin metal layer has a thickness of between about 2 nm to about 25 nm.

8. The interference filter structure of claim 1, wherein the semi-absorbing film is a metal film.

9. The interference filter structure of claim 1, wherein the metal film is of a material selected from Cr, Inconel, Ni, V, Au, Cu, Zn, and combinations thereof.

10. The interference filter structure of claim 1, wherein the semi-absorbing film has a thickness of between about 2 nm to about 15 nm.

11. The interference filter structure of claim 1, wherein the filter is combined with an optical component selected from diffractive devices, active electrochromic devices, piezochromic devices, thermochromic devices, photochromic devices, UV-fluorescent devices, upconverting nanoparticles, magnetic materials and combinations thereof.

12. An interference filter structure comprising a filter having a top side and a bottom side, the filter comprising:
   a partially reflecting/transmitting thin metal layer;
   dielectric spacers on each side of the partially reflecting/transmitting thin metal layer, and a semi-absorbing film on at least a portion of a top side of a top one of the dielectric spacers, and a bottom side of a bottom one of the dielectric spacers;
   wherein the filter provides a reflection mode when observed from a top or a bottom side of said filter, wherein light transmission is side independent, and wherein the filter is metameric.

13. An interference filter structure comprising a filter having a top side and a bottom side, the filter comprising:
   a partially reflecting/transmitting thin metal layer;
   dielectric spacers on each side of the partially reflecting/transmitting thin metal layer, and a semi-absorbing film on at least a portion of a top side of a top one of the dielectric spacers, and a bottom side of a bottom one of the dielectric spacers;
   wherein the filter provides a reflection mode when observed from a top or a bottom side of said filter, wherein light transmission is side independent, and wherein the filter further comprises an image patterned therein.

14. The interference filter structure of claim 13, wherein the filter comprises a section of inverted asymmetry such that the image is visible in reflection mode from the top side and a negative of the image is visible in reflection mode from the bottom side.

15. The interference filter structure of claim 14, wherein the image is invisible in transmission mode.

16. The interference filter structure of claim 13, wherein the filter comprises a metameric non-iridescent pigmented material exhibiting an image pattern in transmission mode and wherein said metameric non-iridescent pigmented material exhibits a matching color in reflection mode.

17. The interference filter structure of claim 13, wherein the image is patterned in only one of the dielectric spacers and is visible in reflection only from the top or bottom side and is visible in transmission mode.

18. The interference filter structure of claim 13, wherein the semi-absorbing film is patterned such that one or a plurality of predetermined areas of the top or bottom side are free of said semi-absorbing film so as to produce an image in reflection having lower color saturation than areas with said semi-absorbing film.

19. An interference security image structure comprising an interference filter structure having a filter having a top side and a bottom side, the filter further comprising:
   a partially reflecting/transmitting thin metal layer;
   dielectric spacers on each side of the partially reflecting/transmitting thin metal layer, and a semi-absorbing film on at least a portion of a top side of a top one of the dielectric spacers, and a bottom side of a bottom one of the dielectric spacers;
   wherein the filter provides a reflection mode when observed from a top or a bottom side of said filter and wherein light transmission is side independent.

* * * * *